United States Patent
Watson et al.

(10) Patent No.: US 6,970,314 B2
(45) Date of Patent: Nov. 29, 2005

(54) MULTIPLE SECTION READ/WRITE HEAD FOR HIGH TRACK DENSITY, FLEXIBLE MEDIA STORAGE APPLICATIONS

(75) Inventors: Mark Watson, Louisville, CO (US); Herman C. Kluge, Erie, CO (US); Joseph M. Schmalhorst, Broomfield, CO (US)

(73) Assignee: Storage Technology Corporation, Louisville, CO (US)

( * ) Notice: Subject to any disclaimer, the term of this patent is extended or adjusted under 35 U.S.C. 154(b) by 384 days.

(21) Appl. No.: 10/163,988

(22) Filed: Jun. 5, 2002

(65) Prior Publication Data

US 2003/0227702 A1 Dec. 11, 2003

(51) Int. Cl.[7] .............................................. G11B 5/09
(52) U.S. Cl. ...................................................... 360/53
(58) Field of Search ......................... 360/25, 31, 77.1, 360/2, 53, 75, 69

(56) References Cited

U.S. PATENT DOCUMENTS

| | | | | |
|---|---|---|---|---|
| 4,558,380 A | * | 12/1985 | Porter | 360/53 |
| 5,587,654 A | * | 12/1996 | Indeck et al. | 360/25 |
| 5,912,778 A | | 6/1999 | Kalfs et al. | |
| 5,949,607 A | | 9/1999 | Kalfs et al. | |
| 5,959,794 A | * | 9/1999 | Indeck et al. | 360/25 |
| 5,973,872 A | * | 10/1999 | Saliba | 360/69 |
| 5,982,711 A | * | 11/1999 | Knowles et al. | 360/77.12 |
| 6,097,570 A | | 8/2000 | Dee | |
| 6,331,920 B1 | * | 12/2001 | Albrecht et al. | 360/63 |
| 6,628,465 B2 | * | 9/2003 | Yong | 360/31 |
| 2003/0043495 A1 | * | 3/2003 | Mayer | 360/75 |

FOREIGN PATENT DOCUMENTS

EP 0 883 110 A2 12/1998

* cited by examiner

*Primary Examiner*—David Hudspeth
*Assistant Examiner*—Glenda P. Rodriguez
(74) *Attorney, Agent, or Firm*—Yee & Associates, P.C.

(57) ABSTRACT

The present invention divides the recording head into multiple sections, each section accessing a subset of the total number of channels arranged such that one section reads and writes only a subset of the data channels. The sections may be either independently actuated for both coarse (data band) and fine (track-following) positioning, or linked by a common actuator for data band positioning with independent fine position actuators for fine track following.

20 Claims, 4 Drawing Sheets

MULTIPLE SECTION READ/WRITE HEAD FOR HIGH TRACK DENSITY, FLEXIBLE MEDIA STORAGE APPLICATIONS

BACKGROUND OF THE INVENTION

1. Field of the Invention

The present invention is generally directed toward an assembly, system, and method for magnetic head design. Specifically, the present invention divides a head assembly having head sections for high track density, flexible media storage applications.

2. Background of the Invention

A read/write head is a device that reads and writes data on a magnetic tape. The surface of the tape is moved past the read/write head. Data is written using a write head. The write head consists of a write coil wound around a highly permeable magnetic core consisting of write poles separated by a small gap—the "write gap." When current is passed through the coil, it produces a magnetic field that magnetizes the core material. This then produces a magnetic field in the write gap that magnetizes the magnetic recording media as it passes through the write gap. By switching polarity of the current in the coil, data can be stored in the media as regions of different magnetization recorded in the magnetic recording media. The regions of opposite recorded magnetization, corresponding to stored data bits, are detected by a read sensor as the recorded media is passed back over the read/write head. A read/write head for high track density tape typically writes or reads multiple data channels simultaneously.

Data throughput may be increased by increasing the number of channels on a read/write head. However, increasing the number of parallel data channels places significant demand on the head fabrication technologies. Augmenting the number of data channels also makes the head more cumbersome due to the number of required conductors by increasing the flex stiffness, the size of the read and write currents carried by the flex, and the dimensions of the flex. Thus, in order to improve data throughput, one must overcome obstacles in head fabrication and the logistics of accurately aligning the more unwieldy head assembly.

Therefore, it would be advantageous to have an improved read/write head design with enhanced data throughput.

SUMMARY OF THE INVENTION

The present invention provides a head design with multiple sections. Each section includes a subset of the data channels for the head. The subset may be a multiple factor of the total number of channels required. The sections may be either independently actuated or aligned with a common actuator.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
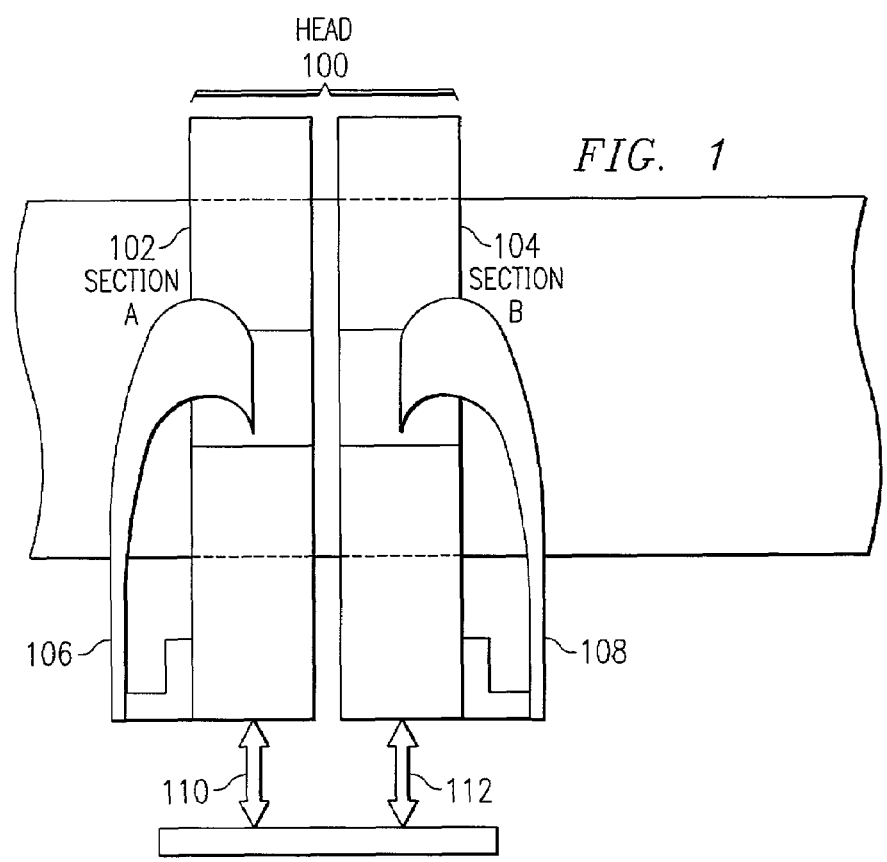
FIG. 1 is a pictorial representation of a multiple section read/write head in which the present invention may be implemented.

With reference now to the figures, and in particular with reference to FIG. 1, a pictorial representation of a multiple section read/write head in which the present invention may be implemented is depicted. Multiple section read/write head 100 is a head assembly having section A 102, section B 104, and position actuators 110, 112. Head sections A and B are connected by flex cables, also referred to as "flexes," 106 and 108, respectively. Since the head assembly is divided into head sections, the flexes are also divided accordingly. Flexes 106 and 108 are made up of conductors to carry read bias and write currents to the read/write head assembly. Position actuators 110 and 112 align the sections to read or write tracks on a tape.

The example shown in FIG. 1 is not meant to imply architectural limitations. For example, the arrangement shown in FIG. 1 may include more sections. The positions of the head sections may be actuated as a single assembly or individually. Further, each head section may have more than one flex. For example, each section may have three flexes for a three bump design or two flexes for a two bump design.

The head assembly, construction and flex layout are greatly simplified. This simplification has several important advantages. First, it reduces the number of tracks per module with attendant reduction in the number of flex conductors. Second, as the number of read/write elements (data channels) on each section is reduced, the head gains off-track margin in the case of media dimensional changes through creep and stretch. Finally, the design is extendable through the lifetime of the drive family, as the number of channels for a head may be increase by adding sections without excessively stressing fabrication and assembly maneuverability.

Figure 2A:
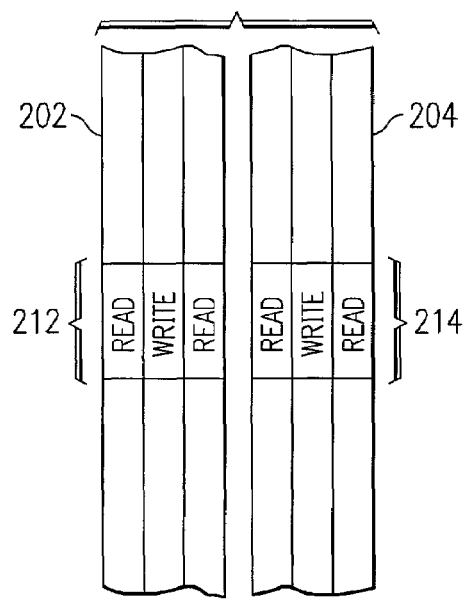
FIGS. 2A–2C are diagrams illustrating example multiple head configurations in accordance with a preferred embodiment of the present invention.
Figure 2B:
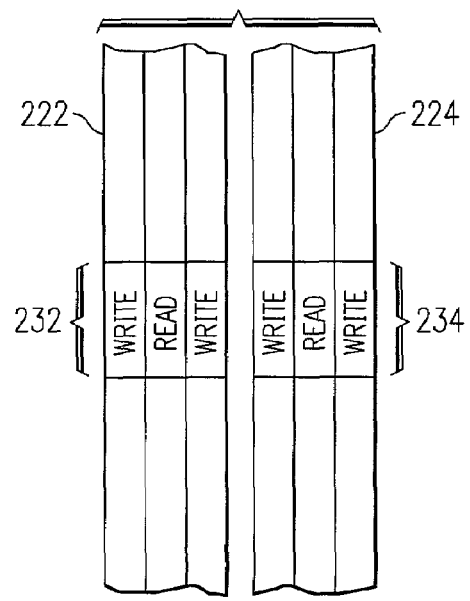
Figure 2C:
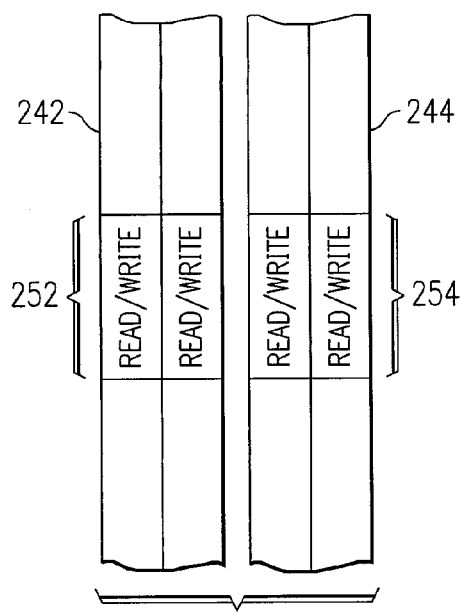

Turning to FIGS. 2A–2C, diagrams illustrating example multiple head configurations are shown in accordance with a preferred embodiment of the present invention. A head assembly may use separate read and write elements in order to verify that the data was written correctly to the data storage media. This is referred to as "read-after-write". After the data is written, the data is read for verification. If any defective block is found, the data is re-written. Read-after-write is preferred because of high defect count on data storage devices or tapes and the open environment of these devices. Particularly, FIGS. 2A and 2B illustrate three-bump configurations while FIG. 2C depicts a merged pole configuration.

Read-after-write can be achieved using a "three bump" design, in which three modules are arranged in either a read/write/read or write/read/write configuration. In other words, the three bump design allows data to be written and subsequently read regardless of the direction of the tape.

More specifically, FIG. 2A shows a read/write/read configuration. Section 202 includes read/write/read arrangement 212 and section 204 includes read/write/read arrangement 214. The read and/or write devices are fabricated on a wafer which is then diced up into separate head modules each of which is assembled to form a "head bump" as shown in FIG. 2A. For example, arrangement 212 may comprise a read module, a write module, and a read module coupled together to form section 202. Each piece of wafer or "bump" is a row or line of read or write elements. Similarly, arrangement 214 forms section 204.

With reference to FIG. 2B, a write/read/write configuration is shown. Section 222 includes write/read/write arrangement 232 and section 224 includes read/write/read arrangement 234. For example, arrangement 212 may comprise a write module, a read module, and a write module coupled together to form section 222. Similarly, arrangement 234 forms section 224.

Currently, the "three bump" design involves a head assembly of three separate modules requiring complex alignments between the three wafers. Additional process and re-work time may be required to correctly align the third module on the head. In addition, the routing of the separate three read and write flexes in a three bump design is highly problematic. This situation is present because the flexes have to be routed in very close proximity to each other within the head structure, to lead both the read and write flexes out to their individual connectors.

In contrast, a "two bump" design that utilizes a merged pole type of head construction has many advantages in that this type of head architecture only requires one critical alignment operation, thereby reducing assembly complexity and time. In a merged pole type of head construction, read elements and write elements are fabricated on the same wafer. As such, the elements on the wafer can be used to perform a read or a write. Thus, two merged pole modules may be coupled together to form a read/write configuration or a write/read configuration depending on the direction of the tape. As there are only two flexes per head, these flexes can be routed relatively simply to minimize feed-through.

Turning to FIG. 2C, a merged pole configuration is shown. Section 242 includes merged pole arrangement 252 and section 244 includes merged pole arrangement 254. For example, arrangement 252 may comprise two wafers of merged pole read/write elements coupled together to form section 242. Each wafer may be fabricated to include a column of read/write elements corresponding to the data channels for the section. Similarly, arrangement 254 forms section 244.

A merged pole read/write element may be used for either a read or a write. Therefore, each one of arrangements 252, 254 may be used as a read/write or a write/read, depending on the direction of the tape, to perform read-after-write.

The examples shown in FIGS. 2A–2C are not meant to imply architectural limitations. Other read/write element fabrication techniques may be used within the scope of the present invention. For example, each section may comprise one read module and one write module without employing read-after-write. As another example, each section may comprise a single merged pole read/write module or wafer without employing read-after write.

Data is recorded on the media as "tracks," each of which is written down the length of the tape by a separate write element and read back by a separate read sensor using read-after-write. The write and read signals to and from each element forms a single data "channel" and, depending on where that element is placed across the width of the media, the data in each channel can be written to, or read from, any track recorded on the media.

However, the number of data channels that can be concurrently written or read on the media is limited by the number of data channels that can be fabricated, configured, and aligned on a head without adversely effecting the maneuverability of the head assembly. In accordance with a preferred embodiment of the present invention, the number of data channels is increased by dividing the data channels into subsets and providing a multiple section head, with each section reading and writing a respective subset of the data channels.

Figure 3A:
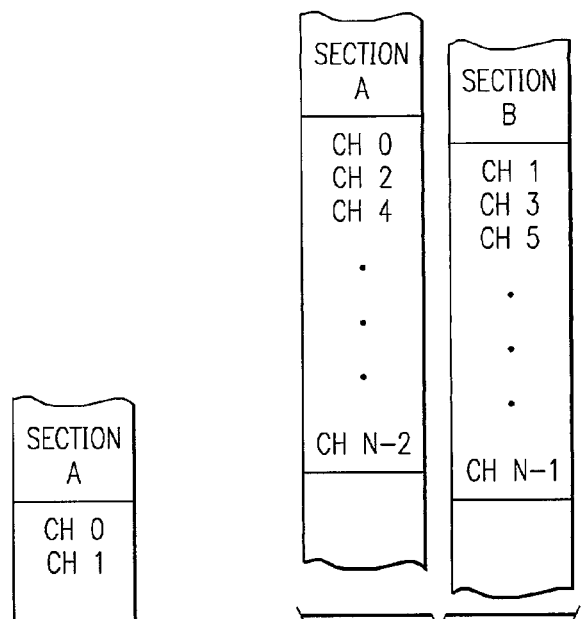
FIGS. 3A–3C are diagrams illustrating example data channel configurations in multiple section head assemblies in accordance with a preferred embodiment of the present invention.
Figure 3B:
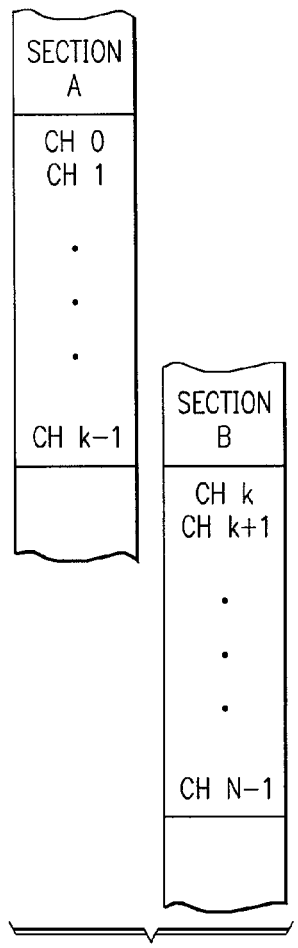
Figure 3C:
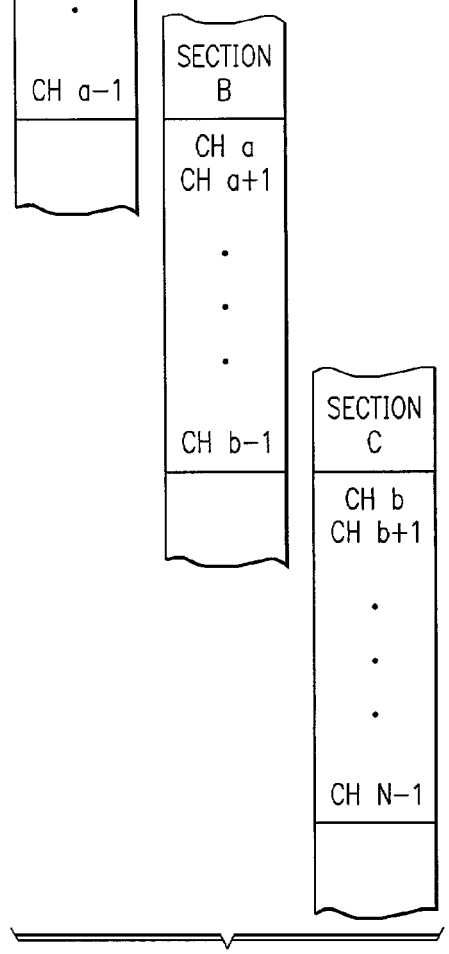

FIGS. 3A–3C are diagrams illustrating example data channel configurations in multiple section head assemblies in accordance with a preferred embodiment of the present invention. More particularly, FIG. 3A shows a configuration in which data channels are interleaved between two sections. The number (N) of data channels is divided into two sections, section A and section B. Section A is aligned to read and/or write channels 0, 2, 4, . . . , N-2 and section B is aligned to read and/or write channels 1, 3, 5, . . . , N-1.

An interleaved configuration requires a higher accuracy in the alignment of the head sections. However, given a reasonable confidence in the alignment, an interleaved configuration allows the head assembly to write and read finer data tracks without having to increase the density of the read/write elements on the head.

With reference now to FIG. 3B, an example configuration in which data channels are divided into two sections is shown. The number (N) of data channels is divided into two sections, section A and section B. Section A is aligned to read and/or write channels 0 to k-1 and section B is aligned to read and/or write channels k to N-1.

The data channels may simply be evenly divided into equal subsets. In other words, k may be equal to N/2. Using actual numbers, 24 data channels may be read and/or written with two 12-channel sections. However, other configurations may also be used. For example, given the same 12-channel sections, 20 data channels may be read and/or written with the section A being aligned to read and/or write channels 0 to 11 and section B being aligned to read and/or write channels 12–19. A person of ordinary skill in the art will recognize that other configurations of sections to read and write data channels may be used within the scope of the invention.

As a further example, FIG. 3C depicts a configuration in which data channels are divided into three sections. The number (N) of data channels is divided into three sections, section A, section B, and section C. Section A is aligned to read and/or write channels 0 to a-1; section B is aligned to read and/or write channels a to b-1; and, section C is aligned to read and/or write channels b to N-1.

Again, the data channels may simply be evenly divided into equal subsets. In other words, a may be equal to N/3 and b may be equal to 2N/3. Using actual numbers, a configuration in which 24 data channels are read and/or written with two 12-channel sections may be extended to read and/or write 36 data channels by adding a third 12-channel section. A person of ordinary skill in the art will recognize that other configurations of sections to read and write data channels may be used within the scope of the invention.

Figure 4A:
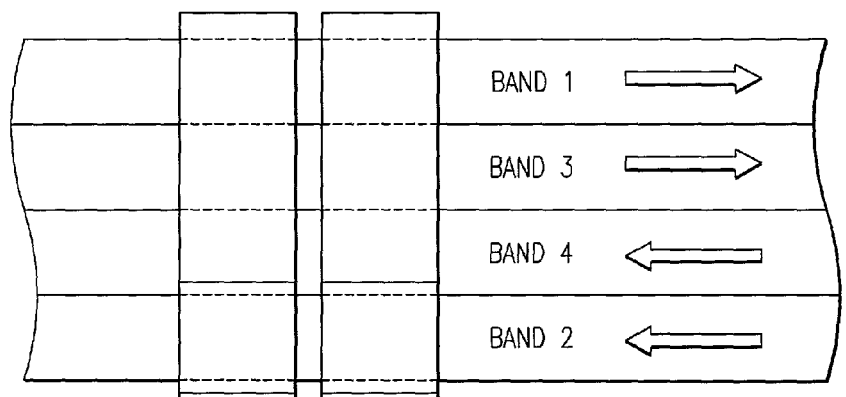
FIGS. 4A–4C are diagrams illustrating example data band configurations with multiple section head assemblies in accordance with a preferred embodiment of the present invention.
Figure 4A:
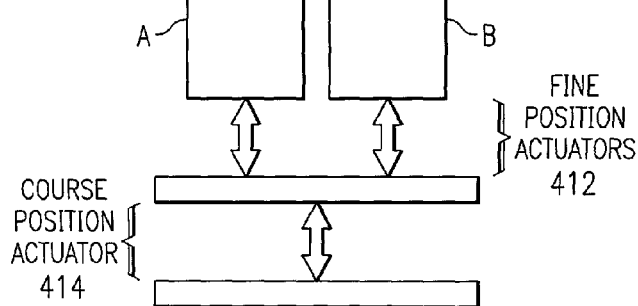
Figure 4B:
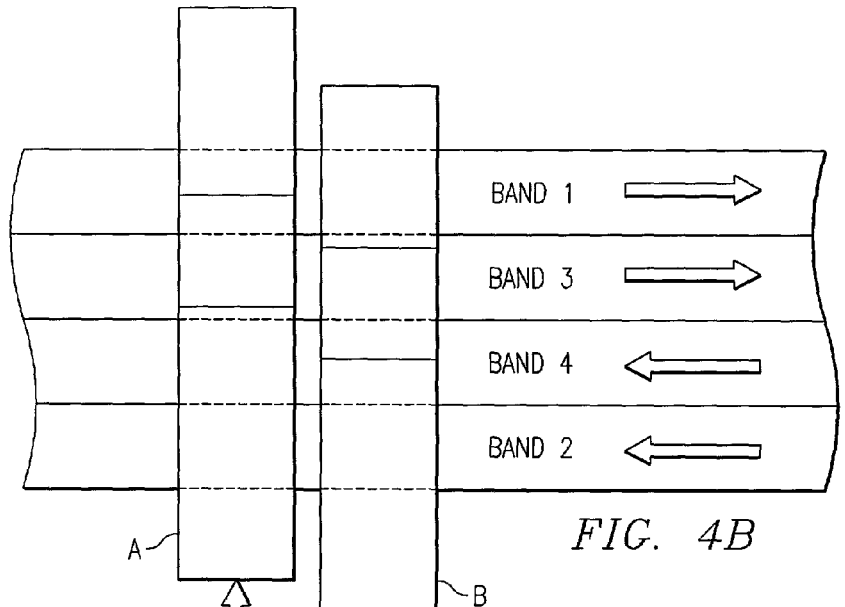
Figure 4B:
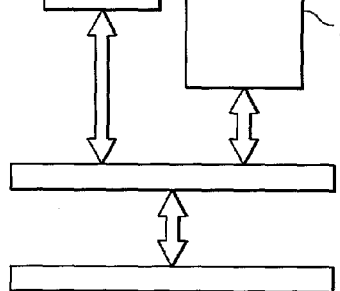
Figure 4C:
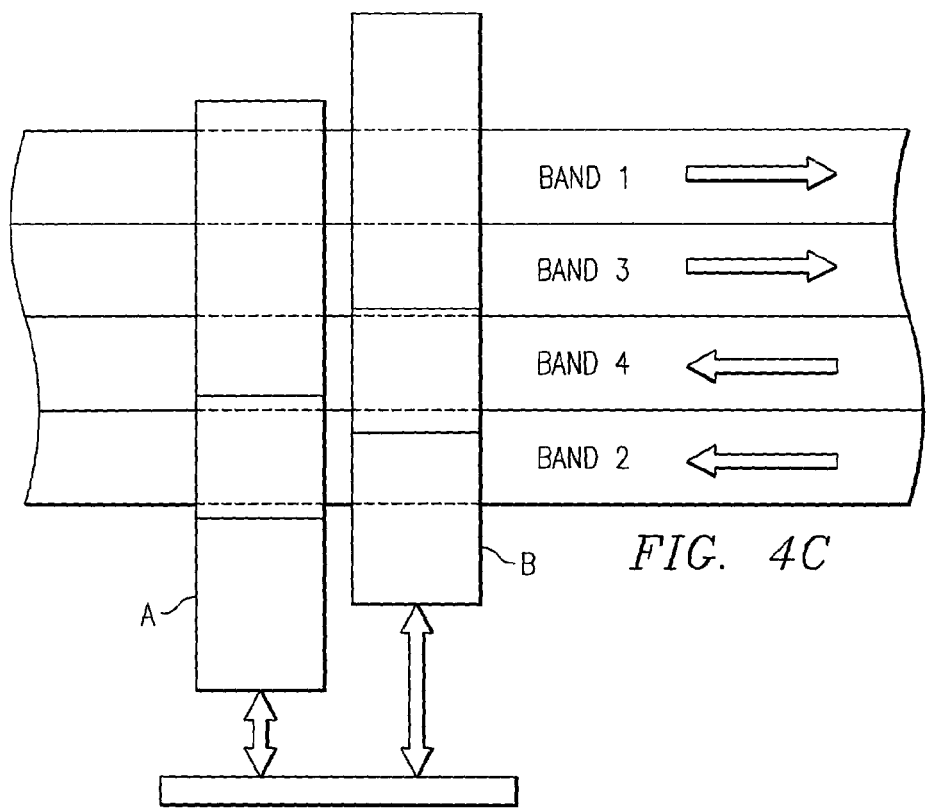

With reference to FIGS. 4A–4C, diagrams illustrating example data band configurations with multiple section head assemblies are shown in accordance with a preferred embodiment of the present invention. Particularly, with reference to FIG. 4A, an interleaved configuration is shown. A tape includes four data bands. The read/write bumps allow the tape drive to operate in a bi-directional mode in order to avoid wasted rewind time. That is, data may be written while the tape travels in either the forward or reverse direction. In the example shown, band 1 and band 3 may be read or written in the forward direction and band 2 and band 4 may be read or written in the backward direction.

Coarse position actuator 414 aligns the sections together. In the example shown in FIG. 4A, course position actuator 414 aligns head section A and head section B to read and/or write data band 2. Fine position actuators 412 independently align the head sections to read and/or write the appropriate data channels in data band 2.

While the example shown in FIG. 4A includes a course position actuator and fine position actuators, other techniques for aligning the head sections may also be used. For example, section A and section B may be aligned to read interleaving data channels and permanently coupled together. In this case, the head assembly can be aligned with a single actuator. Alternatively, the course position actuator may be eliminated and the head sections can be aligned to the appropriate data band and data channels completely independently.

With reference now to FIG. 4B, a multiple head configuration is shown in which section A and section B read different data channels in the same data band. In one embodiment, a course position actuator aligns the head sections to read and/or write data in band 3 and fine position actuators align the sections to read and/or write the appropriate data channels within data band 3. However, a person of ordinary skill in the art will recognize that other techniques for aligning the head sections may also be used.

Turning next to FIG. 4C, a pictorial representation of two section read/write head extending to different data bands is depicted. In this example, section A and section B may access different data bands at the same time. In a preferred embodiment of the present invention, each section may simultaneously and independently extend to different data bands as long as the data bands are accessible in the same direction. For example, section A is capable of being extended to data band 2 located at the bottom of the tape while section B is aligned to access data band 4. In the example shown in FIG. 4C, the head sections may be aligned using separate, independent position actuators.

Figure 5A:
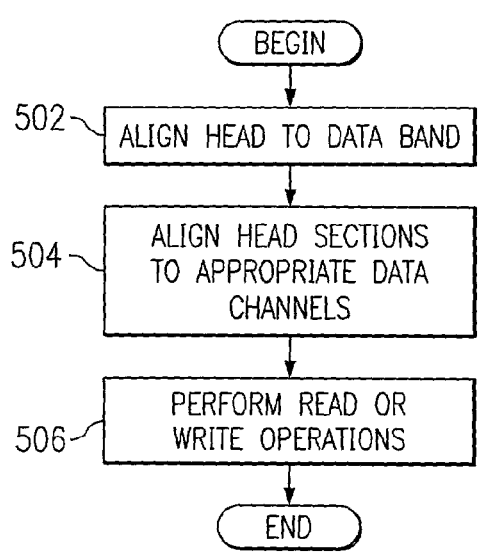
FIGS. 5A and 5B are flowcharts illustrating the operation of a multiple section head assembly in accordance with a preferred embodiment of the present invention.
Figure 5B:
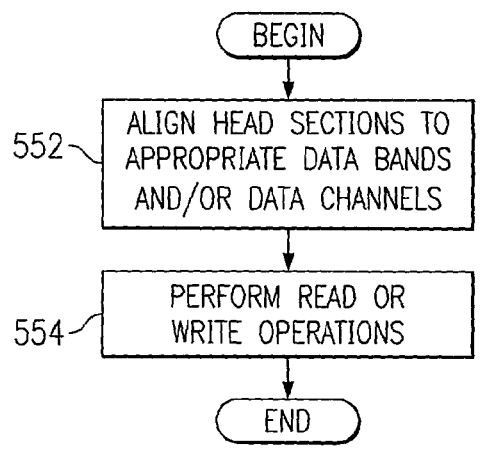

With reference now to FIGS. 5A and 5B, flowcharts illustrating the operation of a multiple section head assembly are shown in accordance with a preferred embodiment of the present invention. Specifically, FIG. 5A depicts the operation of a head assembly with separate course and fine position actuators. The process begins and aligns the head assembly to the appropriate data band using a coarse position actuator (step 502). Then, the process aligns the head sections to the appropriate data channels using fine position actuators (step 504), performs the read or write operations (step 506) and ends.

FIG. 5B depicts the operation of a head assembly which aligns the head sections completely independently without a course position actuator. The process begins and aligns the head sections to the appropriate data bands and/or data channels (step 552). The head sections may be aligned to the same or different data bands. Alternatively, the head sections may be aligned to interleaved or separate data channels within a data band. Thereafter, the process performs the read or write operations (step 554) and ends.

Thus, the present invention solves the disadvantages of the prior art by providing a multiple section head assembly. The head sections may be aligned to read and/or write an increasing number of data channels without having to push the limits of head fabrication technology. Each head section is configured to access a smaller number of data channels. The reduction in the mass of the head sections, and the stiffness of the flexes, makes it easier for the servo actuator to position the head sections. In addition, the design is extendible because the number of data channels being read or written may be increased by adding a head section.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A read/write head assembly for accessing a plurality of data channels on a magnetic tape medium, the read/wrote head assembly comprising:
   a first head section, wherein the first head section accesses a first subset of the plurality of data channels on the magnetic tape medium; and
   a second head section, wherein the second head section accesses a second subset of the plurality of data channels on the magnetic tape medium,
   wherein the first head section and second head section are aligned independently to access the first subset of data channels and the second subset of data channels concurrently.

2. The read/write head assembly of claim 1, wherein at least one of the first head section and the second head section is a three bump head section.

3. The read/write head assembly of claim 2, wherein the three bump head section comprises one of a read/write/read configuration and a write/read/write configuration.

4. The read/write head assembly of claim 1, wherein at least one of the first head section and the second head section is a two bump head section.

5. The read/write head assembly of claim 4, wherein the two bump head section comprises two merged pole modules.

6. The read/write head assembly of claim 1, wherein the first head section writes data to the first subset of the plurality of data channels and the second head section writes data to the second subset of the plurality of data channels.

7. The read/write head assembly of claim 6, wherein the first head section and the second head section perform read-after-write data verification.

8. The read/write head assembly of claim 1, wherein the first subset of the plurality of data channels and the second subset of the plurality of data channels are interleaved.

9. The read/write head assembly of claim 1, further comprising a third head section, wherein the third head section accesses a third subset of the plurality of data channels.

10. A data recording system comprising:
    a magnetic tape read/write head including:
       a first head section, wherein the first head section accesses a first subset of data channels; and
       a second head section, wherein the second head section accesses a second subset of data channels;
    a first fine position actuator that aligns the first head section to access the first subset of data channels; and a second fine position actuator that aligns the second head section to access the second subset of data channels.

11. The data recording system of claim 10, wherein the first subset of data channels and the second subset of data channels are in the same data band.

12. The data recording system of claim 11, wherein the data recording system further comprises:
a course position actuator that aligns the read/write head to the data band,
wherein the first fine position actuator aligns the first head section to access the first subset of data channels within the data band; and
wherein the second fine position actuator aligns the second head section to access the second subset of data channels within the data band.

13. The data recording system of claim 11, wherein the first subset of data channels and the second subset of data channels are interleaved.

14. The data recording system of claim 10, wherein the first subset of data channels is in a first data band and the second subset of data channels is in a second data band.

15. The data recording system of claim 14, wherein the first fine position actuator aligns the first head section to access the first subset of data channels within the first data band; and
wherein the second fine position actuator aligns the second head section to access the second subset of data channels within the second data band.

16. A method for accessing a plurality of data channels on a magnetic tape medium, the method comprising:
aligning a first head section to access a first subset of the plurality of data channels on the magnetic tape medium; and
aligning a second head section to access a second subset of the plurality of data channels on the magnetic tape medium,
wherein the first head section and second head section access the first subset of data channels and the second subset of data channels concurrently and wherein the first head section and the second head section are aligned independently.

17. The method of claim 16, wherein the first head section writes data to the first subset of the plurality of data channels and the second head section writes data to the second subset of the plurality of data channels.

18. The method of claim 17, wherein the first head section and the second head section perform read-after-write data verification.

19. The method of claim 16, wherein the first subset of the plurality of data channels and the second subset of the plurality of data channels are interleaved.

20. The method of claim 16, further comprising aligning a third head section to access a third subset of the plurality of data channels.

* * * * *